United States Patent Office 2,883,784
Patented Apr. 28, 1959

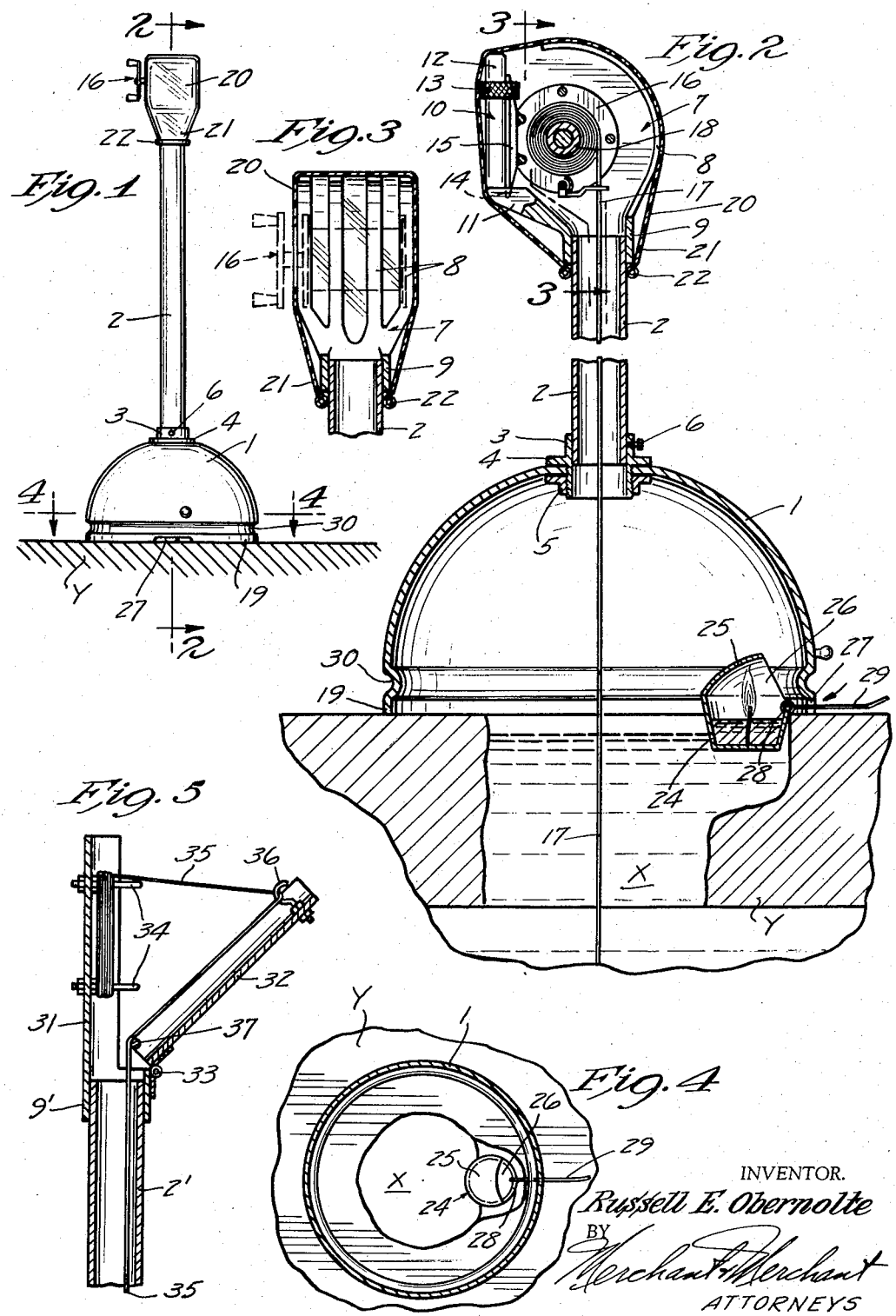

2,883,784

ICE FISHING EQUIPMENT

Russell E. Obernolte, Minneapolis, Minn.

Application September 12, 1957, Serial No. 683,560

2 Claims. (Cl. 43—4)

My invention relates generally to fishing equipment and more particularly to ice fishing gear.

The primary object of my invention is the provision of a novel shell-like hood adapted to be placed over a fishing hole through the ice with its marginal edge portions supported by the ice surrounding said hood, said hood being provided with an upwardly projecting tubular neck which is provided at its upper end with an enlarged head which defines a fish line storage chamber.

A further object of my invention is the provision of a device of the class above described in further combination with a combustible source of heat within said hood, whereby the temperature therewithin may be controlled to prevent not only freezing of the ice in the hole, but also the freezing of the water-soaked fish line.

A further object of my invention is the provision of a device of the class immediately above described wherein the source of heat is a candle within a buoyant container, and in which the bottom of the hood is notched to provide a source of air for said candle, said buoyant container being formed to provide a pivoted tongue which is adapted to project laterally therefrom through the air inlet, whereby to retain said buoyant container in close proximity to said source of air.

A further object of my invention is the provision of a device of the class above described wherein said head is skeletonized and defines a mount for a conventional casting reel, and in further combination with a flexible drawstring-equipped cap adapted to be stretched over said skeleton-like head, said cap having an opening in one side thereof for the projection therethrough of the winding crank of said reel.

A still further object of my invention is the provision of a device of the class described wherein said hood is dome-shaped and is formed to provide an annular winding groove in upwardly spaced relationship to the bottom edge thereof.

A still further object of my invention is the provision of a device of the class above described which is relatively inexpensive to produce, which is foolproof in its operation, and which is rugged and durable.

The above and still further objects of my invention will become apparent from the following detailed specification, appended claims, and attached drawings.

Referring to the drawings wherein like characters indicate like parts throughout the several views:

Fig. 1 is a view in front elevation of my novel structure;

Fig. 2 is an enlarged sectional view as seen substantially from the line 2—2 of Fig. 1;

Fig. 3 is a fragmentary sectional view as seen substantially from the line 3—3 of Fig. 2;

Fig. 4 is a view in transverse section as seen substantially from the line 4—4 of Fig. 1; and Fig. 5 is a fragmentary view in vertical section of a modified form of my invention.

Referring initially to the structures of Figs. 1 and 4 inclusive of the drawings, the numeral 1 indicates in its entirety a shell-like hood, preferably and as shown of dome shape, formed from suitable preferably transparent material or the like, and having rigidly secured to and projecting upwardly from its upper central portion, a tubular neck 2. As shown, this is accomplished through the medium of a clamping collar 3, having a radially projecting annular flange 4 overlying the upper surface of the dome 1, and a flange-equipped clamping nut 5 having screw threaded engagement with the lower end of the clamping collar 3 and engaging the under surface of the dome 1. A set screw 6 in the upper end portion of the clamping collar 3 engages the tubular neck 2 and secures same in position against vertical and rotary movements.

Rigidly secured to and carried by the upper end portion of the tubular neck 2 is an enlarged head 7 which preferably is skeletonized in nature, the same being open on opposite sides and having spaced ribs 8, formed integrally with a sleeve 9, defining its forward limits. The rearward limit of the skeletonized head 7 is defined by a mounting means for a conventional casting reel, identified in its entirety by the numeral 10 and including a base member 11, formed integrally with and projecting rearwardly from the sleeve 9, in diametrically opposed relationship to the ribs 8. Rigidly secured to and projecting upwardly from the base member 11, to a height approximating the height of the ribs 8, is a mounting post 12 which is slidably equipped with a conventional locking collar 13.

As shown in Fig. 2, the base 11, immediately forwardly of the mounting post 12, is notched as at 14 for the reception of one reduced end of a foot 15 with which conventional casting reels 16 are provided. It will be noted by reference to Fig. 2, that when the reel 16 is clamped in operative position, that the fish line 17 about the winding drum 18, is permitted to feed downwardly through the tubular neck 2 and through the dome 1 in spaced relation to the sides thereof, whereby to enter and pass through the fishing hole X in the ice Y. In use, the dome 1 is positioned in overlying relationship to a hole X in the ice Y with its peripheral flange 19 in outwardly spaced relationship to the hole X, as shown in Fig. 2.

To substantially close the skeleton-like head 7, I provide a cap 20 formed from any suitable, preferably waterproof sheet plastic or fabric material, and provided at its closure-forming lower end 21 with a suitable drawstring 22 which may be either in the nature of an endless rubber band or a tiestring.

Finally, to assure sufficient warmth within the hood 1, the neck 2 and the cap-covered head 7, so as to positively prevent freezing of the water within the hole X as well as preventing the formation of ice on the water-soaked line 17, I provide a source of combustible heat within the hood 1. Preferably and as shown, the source of heat is a tallow candle within a buoyant cup-like container 24, as shown having a visor 25 thereon which defines a restricted forwardly opening mouth 26. As shown particularly in Figs. 1 and 2, and for the purpose of assuring a source of air for the candle, I provide a notch 27 in the peripheral edge 19 of the dome 1. Pivotally secured to the lip 28, defining the lower limits of the mouth 26, is an anchoring tongue 29 which is adapted to project laterally through the notch 27, without restricting the passage of air therethrough. As shown in Fig. 2, any object may be placed upon the outwardly projected portion of the tongue 29 to maintain the buoyant cup 24 in position immediately adjacent the air-supplying slot 27.

A further novel feature of my invention is providing the dome-like hood 1 with an endless radially outwardly opening notch 30 around which to wind a fish line, if desired.

In the modified form of the invention shown in Fig. 5, the tubular neck is identified by the numeral 2' and the sleeve carried by the upper end thereof by the numeral 9'. Carried by and projecting generally upwardly from the sleeve 9' are cooperating fixed and movable tube-forming sections 31 and 32 respectively, the former of which is preferably integrally formed with the sleeve 9' and the latter of which is pivotally secured at its lower end to the upper end of the sleeve 9', as indicated at 33. Suitably secured to the fixed section 31 and projecting radially inwardly therefrom in the direction of the movable section 32 are a pair of longitudinally spaced cleat-forming fingers 34 for the winding thereabout of the fish line 35. In operation, the line 35 is first wound about a guide 36, preferably and as shown in the nature of an upwardly opening hook positioned adjacent the upper end of the section 32. Thereafter, the line 35 is caused to run over a generally diametrically extended guide pin 37 adjacent the lower end of the section 32, from whence it drops vertically through the tubular neck 21 and through the dome 1 and so forth, as shown in Fig. 2.

My invention has been thoroughly tested and found to be completely satisfactory for the accomplishment of the above objects and while I have shown a preferred embodiment thereof, it should be obvious that the same is capable of modification without departure from the scope and spirit of the appended claims.

What I claim is:

1. In a device of the class described, a shell-like hood adapted to be supported on the ice in overlying relationship to a hole through the ice with its marginal edge portions in spaced relation to said hole, an open-ended tubular neck carried by said hood and projecting upwardly from the intermediate portion thereof, a head overlying and carried by the open upper end of said neck, said head defining a fish line storage chamber, said hood being formed at its marginal supporting edge with an air inlet forming notch, and a buoyant container for a source of combustible heat, said container being provided with a pivoted tongue which is adapted to project laterally therefrom in spaced relation to the bottom thereof through said air inlet forming notch, whereby to retain said buoyant container in close proximity to a source of air, said container further being provided with a hood which opens in the direction of said tongue and air inlet forming notch.

2. The structure defined in claim 1 in which said head is open at opposite sides and defines means for detachably anchoring a conventional foot-equipped casting reel therein in a manner whereby the winding crank of said reel projects outwardly through one of said open sides, said means comprising a base member having an upwardly opening groove for the reception of one end of the foot of said reel, a mounting post carried by said member and projecting upwardly therefrom and immediately behind said groove, and a locking collar carried by said post and adapted to engage the other end of the foot of said reel, and in further combination with a drawstring-equipped flexible cap adapted to be stretched over said head, said cap having an opening in one side thereof for the projection therethrough of the winding crank of said reel.

References Cited in the file of this patent
UNITED STATES PATENTS 1,253,746    Teeling               Jan. 15, 1918
2,618,091    Sheraski             Nov. 18, 1952